Oct. 3, 1950
W. S. PRAEG
2,524,541
GRINDER
Filed Oct. 6, 1947
2 Sheets-Sheet 1
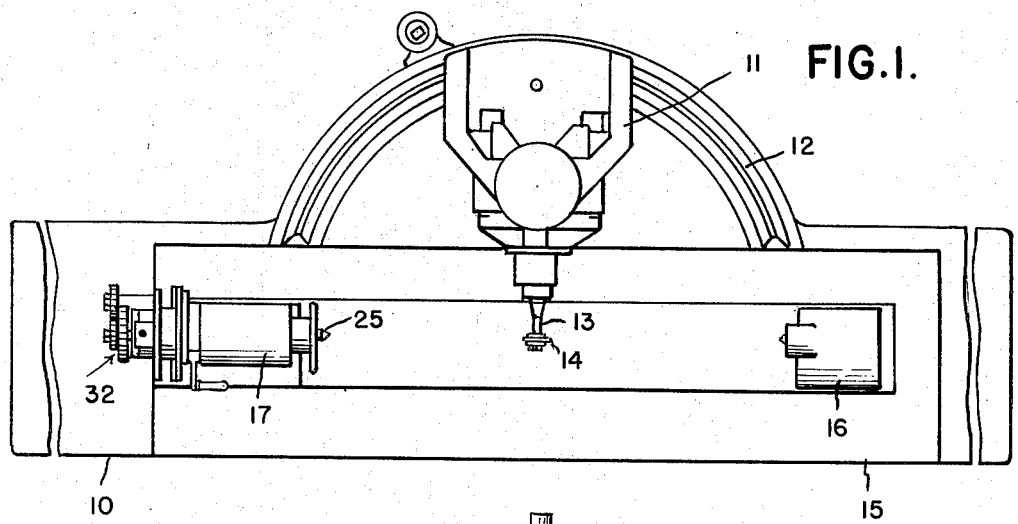
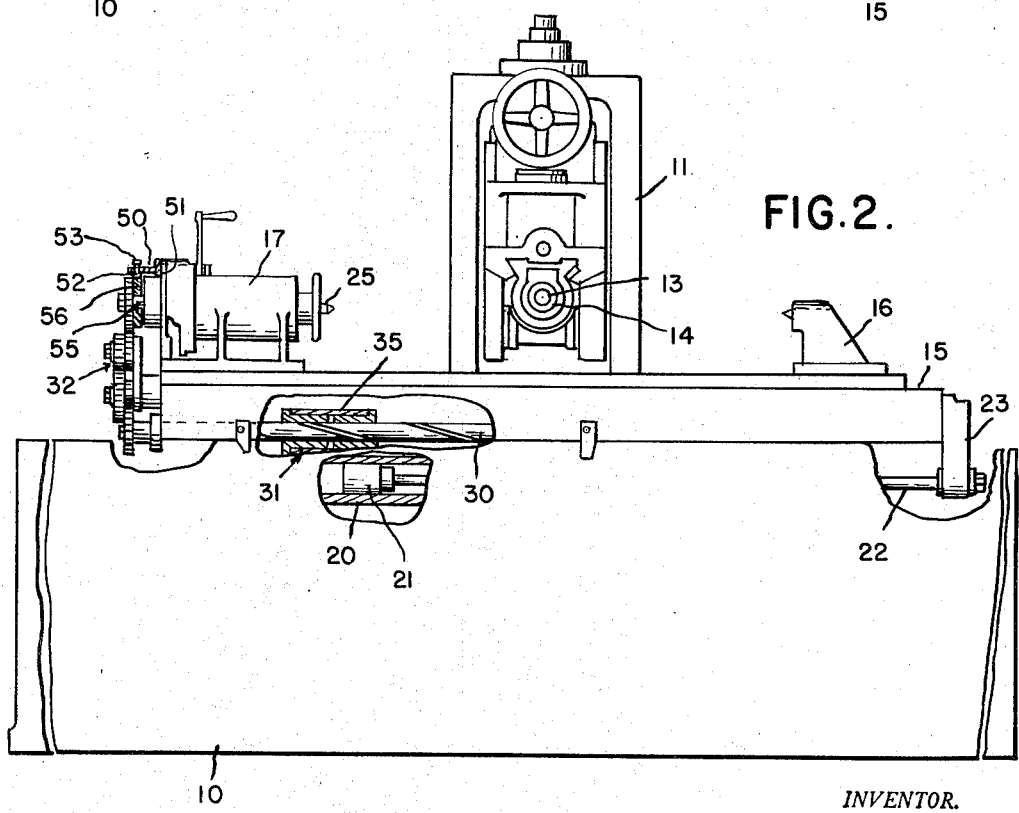
INVENTOR.
WALTER S. PRAEG
BY
Whittemore, Hulbert
& Belknap
ATTORNEYS Oct. 3, 1950     W. S. PRAEG     2,524,541
GRINDER Filed Oct. 6, 1947     2 Sheets-Sheet 2

INVENTOR.
WALTER S. PRAEG
BY
Whittemore, Hulbert
& Belknap
ATTORNEYS

Patented Oct. 3, 1950

2,524,541

UNITED STATES PATENT OFFICE 2,524,541

GRINDER

Walter S. Praeg, Detroit, Mich., assignor to National Broach & Machine Company, Detroit, Mich., a corporation of Michigan Application October 6, 1947, Serial No. 778,090

4 Claims. (Cl. 51—123)

The present invention relates to a grinding machine and more particularly to a machine for grinding a rotary work piece having helical surfaces in such a manner that the grinding of a single helical surface will be accomplished on traverse in only one direction. Thus, where the grinder is employed to grind a helical groove or the space between helical teeth, the grinding wheel will contact first one and then the other side of the groove or tooth space.

It is therefore an object of the present invention to provide a grinder adapted to grind a helical surface of a work piece upon traverse in one direction and to provide clearance between the grinding wheel and the surface upon traverse in the other direction.

It is a further object of the present invention to provide a grinding machine effective to grind first one side and then the other of a helical slot or tooth space upon traverse in opposite directions.

Other objects and features of the invention will become apparent as the description proceeds, especially when considered in conjunction with the accompanying drawings, wherein:

Figure 1 is a plan view of a grinding machine constructed in accordance with the present invention;

Figure 2 is a front elevation of the grinding machine shown in Figure 1, with parts broken away;

Figure 3:
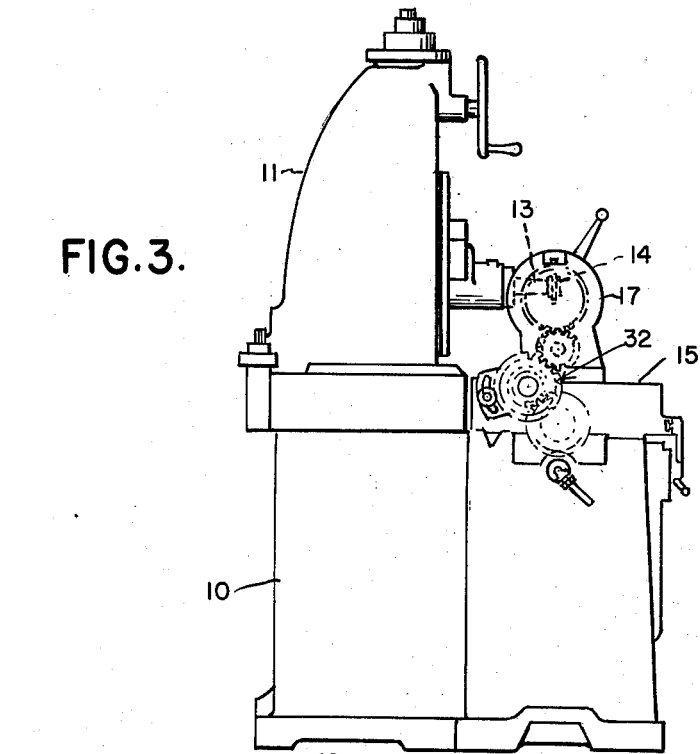
Figure 3 is a side elevation of the grinding machine shown in Figure 1.

Referring now to the figures, the grinding machine comprises a base or frame 10 on which is mounted a tool supporting head 11. As best seen in Figure 1, the tool supporting head 11 is mounted on arcuate ways 12 so as to provide for angular adjustment of the tool support. The tool support comprises a spindle 13 to which the grinding wheel 14 is secured and the center of curvature of the arcuate ways 12 coincides with the center of the grinding wheel 14. Suitable means are provided for rotating the grinding wheel in a well-known manner.

Mounted on the base 10 is a table 15 having a tailstock 16 and a headstock 17 secured thereto. Means are provided for reciprocating the table 15, and as illustrated in Figure 2 may take the form of a cylinder 20 in which is a piston 21 provided with a connecting rod 22 secured to a depending lug 23 at one end of the table 15.

Means are provided for imparting rotation to the center 25 of the headstock 17 and a means suitable for this purpose is illustrated as a lead bar 30 secured to and reciprocatable with the table 15. A lead nut 31 is secured in a stationary relation with respect to the base 10. The lead bar and nut are provided with cooperating helical guiding surfaces so that as the table 15 reciprocates rotation is imparted to the lead screw 30.

Rotation of the lead screw 30 is transmitted to the center 25 through change gears indicated generally at 32, these change gears being provided so that a single lead bar may be effective to produce different relative rotations of the center 25.

Figure 4:
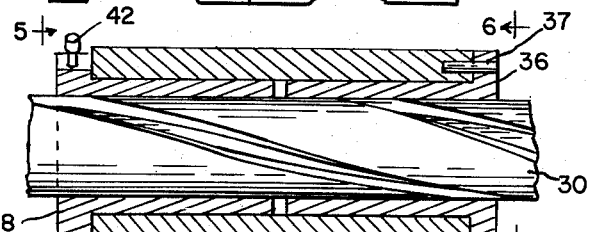
Figure 4 is a fragmentary sectional view through the lead nut and lead bar assembly.
Figure 5:
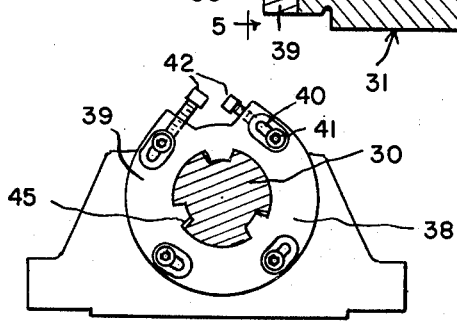
Figure 5 is a section on the line 5—5 of Figure 4.
Figure 6:
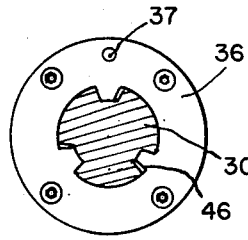
Figure 6 is a section on the line 6—6 of Figure 4.

Referring now to Figures 4 to 6, there is illustrated in detail the lead nut 31 and a portion of the lead bar 30 cooperating therewith. The lead nut comprises a sleeve 35 which is rigidly secured to a portion of the base 10. At one end of the sleeve 35 is a stationary nut element 36 which is illustrated as pinned to the sleeve 35 by pins 37. At the opposite end of the sleeve 35 is an adjustable nut element 38 having a radially extending flange 39 which in turn is provided with a plurality of arcuate slots 40. Clamping bolts 41 pass through the arcuate slots and are threaded into tapped openings in the sleeve member 35 so as to clamp the nut element 38 in adjusted position with respect thereto. Additional means are provided for effecting carefully controlled rotative adjustments of the adjustable nut element 38. These means take the form of a pair of set screws 42, the ends of which engage the adjacent clamping bolts 41. Thus by loosening the clamping bolts 41 and loosening one of the adjusting screws 42 while tightening the other, the adjustable lead nut element 38 may be adjusted in an accurately controlled manner.

Preferably each of the nut elements 36 and 38 is formed so as to have a certain amount of backlash with respect to the lead screw 30. Thus in Figure 5 backlash appears at 45 while as shown in Figure 6, backlash between the lead screw 30 and the nut element 36 appears at 46. As a result of the construction just described it is therefore possible to provide a controlled amount of backlash between the lead screw 30 and the composite lead nut 31.

Referring now to Figure 2, a brake means is provided which is effective to take up the backlash between the lead nut and lead screw and to reverse the direction of backlash upon a reversal in the direction of traverse of the table 15. This means comprises a lever 50 pivoted as indicated at 51 to the headstock casting and carrying a section of brake block indicated at 52. Screw means, as indicated at 53, are provided for effecting adjustment between the brake block section 52 and the lever 50. Keyed or otherwise secured to a spindle 55 of the headstock 17 is a brake drum section shown at 56. The brake block 52 bears against the outer periphery of the brake drum 56 with a force which may be adjustable by manipulation of the screw means, which last means are also effective to take up wear as it occurs on the brake block.

While specific adjustable means are illustrated for providing a controlled amount of backlash in the work rotating mechanism, it will be appreciated that in some cases sufficient backlash will be inherently present by virture of tolerances in the parts and particularly backlash in the change gears. In this case no specific means may be necessary to provide for backlash.

With the foregoing described construction the grinding wheel 14 may be employed to grind a helical groove or tooth space in a novel manner. Initiation of traverse in one direction applies a force to the spindle 55 which by virtue of the brake mechanism resists rotation until all backlash has been taken up in the rotative mechanism. This backlash may be very small, on the order of a few thousandths of an inch. Thereafter further traverse of the table 15 in the same direction will result in controlled timed rotation of the work center 25 in accordance with the lead of the lead screw and the relationship of the change gears 32. Upon reversal of traverse, the brake mechanism prevents rotation of the work center 25 until all backlash has been taken up in the work rotating mechanism in the opposite direction. As will be apparent, this will result in a small relative rotational phase shift of the work piece as it is traversed in opposite directions and accordingly the grinding wheel 14 will grind on one side of a space in one direction and on the other side of the space in the other direction. The provision of the brake mechanism insures that the backlash is taken up by the application of a predetermined resistance to insure uniformity in results. In some cases equivalent results may be obtained without the provision of specific brake mechanism, depending merely upon resistance of the parts to rotation to accomplish a similar result.

Figure 7:
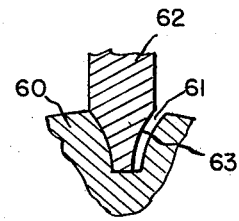
Figure 7 is a fragmentary view illustrating the grinding of a slot having involute sides.
Figure 8:
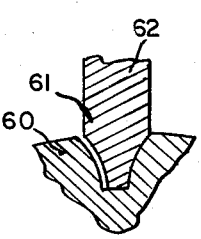
Figure 8 is a view similar to Figure 7 showing the clearance taken up in the other direction.

Figures 7 and 8 illustrate the use of the present invention in grinding a slot or tooth space in which the sides of the slots are of involute form. In Figure 7 the work piece 60 is shown as having a slot or tooth space 61 the sides of which are being ground by a formed grinding wheel 62. In this case the sides of the slots 61 are of involute form and accordingly the grinding surfaces 63 of the wheel are formed of the desired involute without modification. In Figure 7 the parts are shown with the clearance taken up so as to grind the left-hand side of the slot 61 as it appears in the figures. Figure 8 is an identical view except that the relationship of parts has been reversed so that the grinding wheel 62 is grinding the right-hand side of the slot 61 as it appears in the figure. Accordingly, when the side walls of the slot or tooth space are of involute form no modification of the grinding surface of the grinding wheel need be made. However, for other forms it will be necessary to provide a modification for the grinding surface of the wheel. Thus, for example, a grinding wheel having parallel edge surfaces at the periphery will form a slot whose walls diverge by an amount depending upon the clearance or backlash of the grinding wheel in the slot. Therefore, if it is desired to grind a slot the opposite walls of which are strictly parallel, the edge surfaces of the grinding wheel adjacent its periphery must be slightly inclined with respect to each other.

The drawings and the foregoing specification constitute a description of the improved grinder in such full, clear, concise and exact terms as to enable any person skilled in the art to practice the invention, the scope of which is indicated by the appended claims.

What I claim as my invention is:

1. A grinder comprising a base, an angularly adjustable tool support on said base, a reciprocable table on said base, rotary work supporting means on said table, means for effecting rectilinear reciprocation of said table, drive means responsive solely to table reciprocation for effecting rotation of said work supporting means, said drive means comprising a lead screw and nut assembly and gearing rotatable in accordance with relative rotation between the lead screw and nut resulting from relative sliding therebetween longitudinally of the lead screw, and a friction brake operable on said work supporting means to prevent rotation of said work supporting means upon reversal of direction of traverse of said table until said table has moved a distance sufficient to take up backlash in said drive means.

2. A grinder comprising a base, an angularly adjustable tool support on said base, a reciprocable table on said base, rotary work supporting means on said table, means for effecting rectilinear reciprocation of said table, drive means responsive solely to table reciprocation for effecting rotation of said work supporting means, said drive means comprising a lead screw and nut assembly and gearing rotatable in accordance with relative rotation between the lead screw and nut resulting from relative sliding therebetween longitudinally of the lead screw, a friction brake operable on said work supporting means to prevent rotation of said work supporting means upon reversal of direction of traverse of said table until said table has moved a distance sufficient to take up backlash in said drive means, and adjustable means for introducing a predetermined amount of backlash into said drive means.

3. A grinder comprising a base, an angularly adjustable tool support on said base, a reciprocable table on said base, rotary work supporting means on said table, means for effecting rectilinear reciprocation of said table, drive means responsive solely to table reciprocation for effecting rotation of said work supporting means, said drive means comprising a lead screw and nut assembly and gearing rotatable in accordance with relative rotation between the lead screw and nut resulting from relative sliding therebetween longitudinally of the lead screw, a friction brake operable on said work supporting means to prevent rotation of said work supporting means upon reversal of direction of traverse of said table until said table has moved a distance sufficient to take up backlash in said drive means, and adjustable means for introducing a predetermined amount of backlash into said drive means, said adjustable means comprising a double lead nut, the parts of which are angularly adjustable.

4. A grinder comprising a base, an angularly adjustable tool support on said base, a reciprocable table on said base, rotary work supporting means on said table, piston and cylinder means for effecting rectilinear reciprocation of said table, drive means responsive solely to table reciprocation for effecting rotation of said work supporting means, said drive means comprising a lead screw and nut assembly and gearing rotatable in accordance with relative rotation between the lead screw and nut resulting from relative sliding therebetween longitudinally of the lead screw, and a friction brake operable on said work supporting means to prevent rotation of said work supporting means upon reversal of direction of traverse of said table until said table has moved a distance sufficient to take up backlash in said drive means.

WALTER S. PRAEG.

REFERENCES CITED

The following references are of record in the file of this patent:

UNITED STATES PATENTS

| Number | Name | Date |
| --- | --- | --- |
| 1,634,386 | Schramm et al. | July 5, 1927 |
| 2,092,895 | Stevens | Sept. 14, 1937 |
| 2,187,227 | Flanders | Jan. 16, 1940 |
| 2,258,510 | Laessker | Oct. 7, 1941 |